Patented Jan. 19, 1954

2,666,764

UNITED STATES PATENT OFFICE 2,666,764

PROCESS OF SPLITTING ARALKYL-HETEROCYCLIC THIOETHERS WITH ALUMINUM BROMIDE

Anthony E. Lanzilotti, Belleville, Anthony C. Shabica, Livingston, and John B. Ziegler, Summit, N. J., assignors to Ciba Pharmaceutical Products, Incorporated, Lafayette Park, Summit, N. J., a corporation of New Jersey No Drawing. Application July 14, 1951, Serial No. 236,864

8 Claims. (Cl. 260—251)

This invention relates to a method for cleaving thioethers.

Numerous methods for the cleavage of thioethers appear in the literature using such diverse reagents as anhydrous hydrogen chloride or hydrogen iodide, phosphorus pentasulfide, sodium alcoholates and so on. In many instances poor yields are obtained because inter alia changes in other parts of the molecule occur.

It is an object of this invention to embody a method of cleaving thioethers in good yield and with minimum decomposition.

According to the invention, this object is realized by a process according to which, briefly stated, the thioether is treated in a solvent such as benzene, toluene, carbon disulfide, carbon tetrachloride and the like with about a molar proportion of anhydrous aluminum bromide. The reaction mixture is then decomposed by means of an hydroxylated solvent, such as water, a mixture of water with a lower alcohol such as methanol or ethanol, or an aqueous solution of an acid such as sulfuric acid or a hydrohalic acid, e. g. hydrochloric acid or hydrobromic acid. The solid which precipitates is filtered, washed, dissolved in aqueous alkali and re-precipitated by acidification. This method is particularly effective in the case of heterocyclic and halogenated heterocyclic mercapto ethers in cases in which all other methods heretofore known have failed.

The reaction involved in the process of the invention may be schematically set forth as follows:

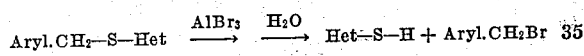

wherein "Aryl" stands for a phenyl or naphthyl radical which may be variously substituted for example by methyl, ethyl, halogen, nitro, etc., and "Het" stands for a heterocyclic radical which, in addition to carbon atoms may, in its ring system, include one or more nitrogen, sulfur and oxygen atoms. As will hereinafter appear, for instance in connection with a thiazole ring system, the ring sulfur atom is not split by the $AlBr_3$ treatment of the present invention. Illustrative heterocyclic radicals comprise the uracil, thiazole, oxazole, imidazole, pyrazole, triazole, oxy-pyrimidine and the like radicals.

The invention is illustrated in greater detail in the examples which follow, which it is to be understood are presented by way of illustration only and not by way of limitation. In the examples, parts by weight bear the same relation to parts by volume as do grams to milliliters. Temperatures are expressed in degrees centigrade. Percentages are given in terms of weight.

Example 1

88.3 parts by weight of anhydrous aluminum bromide are dissolved in 500 parts by volume of toluene at room temperature (about 20–30°) and 103 parts by weight of 2-benzyl-5-iodo-thiouracil

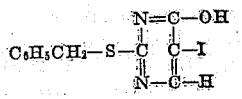

added rapidly. The temperature begins to rise and in about 10 minutes a precipitate appears. The temperature reaches a maximum of 60–65° and is maintained at this level for six hours, after which time the reaction mixture is allowed to stand overnight at room temperature.

50 parts by volume of water are then added slowly over a period of one hour while maintaining the mixture below 40°. An additional 50 parts by volume of water is added, the mixture stirred vigorously for 30–40 minutes and filtered. The collected solid is air-dried, digested with 150 parts by volume of hot ethanol and filtered hot.

65 parts by weight of the residue from the alcohol digestion is dissolved at 65° in 455 parts by volume of water containing 11.3 parts by weight of sodium hydroxide. The solution is treated with activated carbon, filtered and treated with 1.5 equivalents of acetic acid, cooled to room temperature, filtered and washed with water and ethanol.

There is thus obtained 5-iodo-2-thiouracil

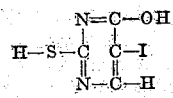

as a white solid which is light-sensitive; melting point 219–221° (decomposition).

Example 2

2.94 parts by weight of anhydrous aluminum bromide are dissolved in 15 parts by volume of dry benzene. To this solution are added 2.57 parts by weight of 2-benzylmercaptobenzothiazole

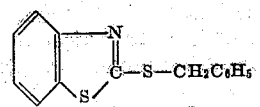

dissolved in 5 parts by volume of dry benzene. After standing for about 70 hours at room temperature, the reaction mixture is treated with 10 parts by volume of water and allowed to stand for 1.5 hours. The solid is collected on a filter, washed with benzene and water and air dried. The product—2-mercaptobenzothiazole—is a yellow solid which melts at 177–178° and corresponds to the formula

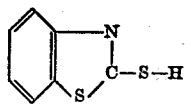

Example 3

31.7 parts by weight of anhydrous aluminum bromide are dissolved in 162 parts by volume of dry benzene. To the clear orange solution are added with stirring 27.3 parts by weight of 5-chloro-2-benzyl-thiouracil

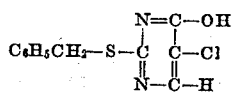

which go into solution with the evolution of heat. An oil separates which solidifies after about 15 minutes. Stirring is discontinued and the mixture is allowed to stand at room temperature for about 70 hours. The mixture is then treated with 30 parts by volume of water with thorough stirring. After standing at room temperature for 1 hour, the mixture is filtered and the solid washed with benzene, then with water and then dried. After recrystallization from ethanol, the 5-chloro-2-thiouracil

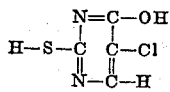

is obtained as small, yellowish needles melting at 262–266° (with decomposition).

The 5-chloro-2-benzylthiouracil may be prepared by the reaction between benzyl chloride and 2-thiouracil in an alkaline water-alcoholic solution, followed by chlorination with gaseous chlorine.

Example 4

2.5 parts by weight of 2-benzylmercaptobenzoxazole

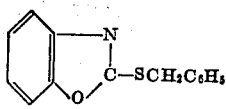

(prepared by reacting 2-chlorobenzoxazole with the sodium salt of benzyl mercaptan, or by reacting benzyl chloride and 2-mercaptobenzoxazole in aqueous alcoholic solution; M. P. 50°) are dissolved in 5 parts by volume of dry benzene, and to the resulting solution is added a solution of 2.94 parts by weight of anhydrous aluminum bromide in 15 parts by volume of dry benzene. After standing for about 70 hours at room temperature, the reaction mixture is treated with 10 parts by volume of water and allowed to stand for 1 hour. The solid is filtered off, washed with benzene and water, and air-dried. The product—2-mercaptobenzoxazole—melts at 196° after recrystallization from alcohol, and corresponds to the formula

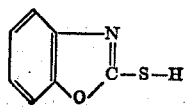

Example 5

10 parts by weight of 5-iodo-2-(1-naphthylmethyl)-thiouracil

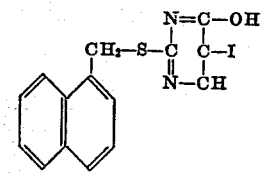

(prepared by the reaction between 1-naphthylmethyl chloride and 2-thiouracil in aqueous alcoholic alkaline solution followed by iodination with $I_2$; M. P. 207–208°, with decomposition) is slurried with 25 parts by volume of dry benzene, and the mixture is added to a solution of 6.67 parts by weight of anhydrous aluminum bromide in 30 parts by volume of dry benzene. The reaction mixture is refluxed for two hours, and then allowed to stand at room temperature for about 16 hours. 25 parts by volume of water are then added, and the mixture filtered, the collected solid being washed with water and benzene. After purification by digestion with hot alcohol and then with hot chloroform, the product —5-iodo-2-thiouracil— melts with decomposition at about 220°. It corresponds to the formula

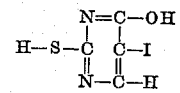

Example 6

The prescriptions of Example 1 are followed except that the 2-benzyl-5-iodo-thiouracil is replaced by an equivalent quantity of 5-iodo-2-(p-methylbenzyl)-thiouracil. The identical product —5-iodo-2-thiouracil is obtained. The latter may also be obtained according to the prescriptions of Example 5 by substituting an equivalent quantity of 5-iodo-2-(p-methylbenzyl)-thiouracil for the 5-iodo-2-(1-naphthylmethyl)-thiouracil employed therein.

In either case, use may be made—with the same result—of other arylmethyl derivatives of 5-iodo-2-thiouracil.

Example 7

2.94 parts by weight of anhydrous aluminum bromide are added to 20 parts by volume of dry benzene and stirred until dissolution is achieved. 2.4 parts by weight of 2-benzyl-mercaptobenzimidazole

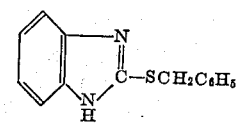

are added quickly to the said solution, and after a few minutes the formed aluminum bromide-benzylmercaptobenzimidazole complex precipitates out. The reaction mixture is kept at room temperature for 48 hours, and the complex is then decomposed by the careful addition of water. The thus-formed 2-mercaptobenzimidazole

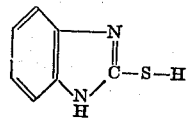

is filtered off, washed with benzene and water, and air dried; melting point 298°.

Having thus disclosed the invention, what is claimed is:

1. A process for cleaving a heterocyclic thioether of the formula

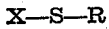

wherein X stands for a heterocyclic radical of not more than two cyclic groups, said heterocyclic radical having at least two hetero atoms one of which is nitrogen and the other is selected from the group consisting of nitrogen, oxygen and sulfur, and R is an aryl.$CH_2$-group wherein aryl is an aromatic hydrocarbon of not more than 10 carbon atoms in the ring, which comprises reacting the said heterocyclic thioether with aluminum bromide in an inert solvent, treating the resulting mixture with an hydroxylated solvent to decompose the formed aluminum complex, and isolating the produced mercaptan of the formula 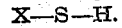

2. A process in accordance with claim 1 wherein the heterocyclic radical is a halogenated thiouracil radical.

3. A process for cleaving a 2-benzyl-thiouracil, which comprises reacting the said thiouracil with aluminum bromide in an inert solvent, treating the resulting mixture with water to decompose the formed aluminum complex, and isolating the produced 2-thiouracil.

4. A process for cleaving 2-benzyl-5-iodo-thiouracil, which comprises reacting the said thiouracil with aluminum bromide in an inert solvent, treating the resulting mixture with water to decompose the formed aluminum complex, and isolating the produced 5-iodo-2-thiouracil.

5. A process for cleaving 2-benzyl-5-chlorothiouracil, which comprises reacting the said thiouracil with aluminum bromide in an inert solvent, treating the resulting mixture with water to decompose the formed aluminum complex, and isolating the produced 5-chloro-2-thiouracil.

6. A process for cleaving 5-iodo-2-(p-methylbenzyl)-thiouracil, which comprises reacting the said thiouracil with aluminum bromide in an inert solvent, treating the resulting mixture with water to decompose the formed aluminum complex, and isolating the produced 5-iodo-2-thiouracil.

7. A process for cleaving 5-iodo-2-(1-naphthylmethyl)-thiouracil, which comprises reacting the said thiouracil with aluminum bromide in an inert solvent, treating the resulting mixture with water to decompose the formed aluminum complex, and isolating the produced 5-iodo-2-thiouracil.

8. A process for cleaving 2-benzylmercaptobenzothiazole, which comprises reacting the said compound with aluminum bromide in an inert solvent, treating the resulting mixture with water to decompose the formed aluminum complex, and isolating the produced 2-mercaptobenzothiazole.

ANTHONY E. LANZILOTTI.
ANTHONY C. SHABICA.
JOHN B. ZIEGLER.

References Cited in the file of this patent

Harnish et al.: J. Am. Chem. Soc. 70, 4123–7 (1948).